US012698382B2

(12) United States Patent
Hayashi et al.

(10) Patent No.: US 12,698,382 B2
(45) Date of Patent: Aug. 4, 2026

(54) RUBBER COMPOSITION

(71) Applicant: COMPAGNIE GENERALE DES ETABLISSEMENTS MICHELIN, Clermont-Ferrand (FR)

(72) Inventors: Tenko Hayashi, Tokyo (JP); Christine Nourry, Tokyo (JP)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 785 days.

(21) Appl. No.: 17/606,381

(22) PCT Filed: Apr. 25, 2019

(86) PCT No.: PCT/JP2019/017582

§ 371 (c)(1),
(2) Date: Oct. 25, 2021

(87) PCT Pub. No.: WO2020/217370

PCT Pub. Date: Oct. 29, 2020

(65) Prior Publication Data

US 2022/0220288 A1 Jul. 14, 2022

(51) Int. Cl.

| | |
|---|---|
| ***C08L 15/00*** | (2006.01) |
| ***B60C 1/00*** | (2006.01) |
| ***C08C 19/22*** | (2006.01) |
| ***C08C 19/25*** | (2006.01) |
| ***C08K 3/04*** | (2006.01) |
| ***C08K 3/36*** | (2006.01) |
| ***C08K 5/01*** | (2006.01) |
| ***C08L 9/06*** | (2006.01) |
| ***C08L 91/00*** | (2006.01) |

(52) U.S. Cl.

CPC ............ *C08L 15/00* (2013.01); *B60C 1/0016* (2013.01); *C08C 19/22* (2013.01); *C08C 19/25* (2013.01); *C08K 3/04* (2013.01); *C08K 3/36* (2013.01); *C08K 5/01* (2013.01); *C08L 9/06* (2013.01); *C08L 91/00* (2013.01); *C08L 2205/025* (2013.01)

(58) Field of Classification Search

CPC .. C08L 15/00; C08L 9/06; C08L 91/00; C08L 2205/025; B60C 1/0016; C08C 19/22; C08C 19/25; C08C 19/44; C08K 3/04; C08K 3/36; C08K 5/01

See application file for complete search history.

(56) References Cited

U.S. PATENT DOCUMENTS

| | | | |
|---|---|---|---|
| 6,013,718 | A | 1/2000 | Cabioch et al. |
| 6,774,255 | B1 | 8/2004 | Tardivat et al. |
| 6,849,754 | B2 | 2/2005 | Deschler et al. |
| 7,217,751 | B2 | 5/2007 | Durel et al. |
| 7,250,463 | B2 | 7/2007 | Durel et al. |
| 7,300,970 | B2 | 11/2007 | Durel et al. |
| 7,488,768 | B2 | 2/2009 | Tardivat et al. |
| 7,491,767 | B2 | 2/2009 | Durel et al. |
| 7,671,132 | B1 | 3/2010 | Thielen et al. |
| 8,492,475 | B2 | 7/2013 | Araujo Da Silva et al. |
| 8,957,155 | B2 | 2/2015 | Seeboth et al. |
| 9,010,393 | B2 | 4/2015 | Araujo Da Silva et al. |
| 9,175,124 | B2 | 11/2015 | Chaboche et al. |
| 9,771,469 | B2 | 9/2017 | Sandstrom et al. |
| 10,160,847 | B2 | 12/2018 | Lesage et al. |
| 10,273,351 | B2 | 4/2019 | Pavon Sierra et al. |
| 10,457,798 | B2 | 10/2019 | Broemmel et al. |
| 10,487,195 | B2 | 11/2019 | Haberkorn et al. |
| 10,570,275 | B2 | 2/2020 | Broemmel et al. |
| 11,111,360 | B2 | 9/2021 | Pawlak et al. |
| 11,124,631 | B2 | 9/2021 | Maeda et al. |
| 11,241,912 | B2 | 2/2022 | Watanabe et al. |
| 11,724,545 | B2 | 8/2023 | Sakurada et al. |
| 2004/0051210 | A1 | 3/2004 | Tardivat et al. |
| 2004/0129360 | A1 | 7/2004 | Vidal |
| 2004/0132880 | A1 | 7/2004 | Durel et al. |
| 2005/0004297 | A1 | 1/2005 | Durel et al. |
| 2005/0016650 | A1 | 1/2005 | Durel et al. |
| 2005/0016651 | A1 | 1/2005 | Durel et al. |
| 2009/0186961 | A1 | 7/2009 | Araujo Da Silva et al. |
| 2009/0209709 | A1 | 8/2009 | Araujo Da Silva et al. |
| 2009/0234066 | A1 | 9/2009 | Araujo Da Silva et al. |
| 2010/0145089 | A1 | 6/2010 | Mignani et al. |
| 2011/0152458 | A1 | 6/2011 | Araujo Da Silva et al. |
| 2011/0178233 | A1 | 7/2011 | Chaboche et al. |
| 2011/0294953 | A1 | 12/2011 | Seeboth et al. |
| 2012/0123018 | A1 | 5/2012 | Kanz et al. |
| 2013/0267640 | A1* | 10/2013 | Lopez .................. B60C 1/0016 524/506 |
| 2013/0289197 | A1* | 10/2013 | Pavon Sierra ........ B60C 1/0016 524/526 |
| 2013/0296471 | A1 | 11/2013 | Lesage et al. |
| 2014/0024745 | A1 | 1/2014 | Vasseur et al. |
| 2014/0243448 | A1 | 8/2014 | Lesage et al. |
| 2016/0376428 | A1 | 12/2016 | Sandstrom et al. |

(Continued)

FOREIGN PATENT DOCUMENTS

| | | | |
|---|---|---|---|
| CN | 109206694 A * | 1/2019 | ........... B60C 1/0016 |
| DE | 60225300 T2 | 2/2009 | |

(Continued)

OTHER PUBLICATIONS

English translation of CN-109206694-A (Year: 2019).*

(Continued)

*Primary Examiner* — Mark Eashoo
*Assistant Examiner* — Cullen L G Davidson
(74) *Attorney, Agent, or Firm* — VENABLE LLP

(57) ABSTRACT

A rubber composition is based on at least an elastomer matrix comprising at least one first diene elastomer bearing at least one SiOR1 function, R1 being a hydrogen atom or a hydrocarbon radical, the SiOR1 function not located at the chain ends of the first diene elastomer, a reinforcing filler comprising a reinforcing inorganic filler, and a plasticizing agent comprising a liquid plasticizer comprising a liquid diene polymer bearing at least one function.

6 Claims, No Drawings

(56) References Cited

U.S. PATENT DOCUMENTS

| | | | |
|---|---|---|---|
| 2017/0051135 | A1 | 2/2017 | Sandstrom et al. |
| 2018/0100058 | A1 | 4/2018 | Pavon Sierra et al. |
| 2018/0118926 | A1 | 5/2018 | Haberkorn et al. |
| 2019/0061425 | A1 | 2/2019 | Broemmel et al. |
| 2019/0062534 | A1 | 2/2019 | Broemmel et al. |
| 2019/0062535 | A1 | 2/2019 | Broemmel et al. |
| 2019/0194429 | A1 | 6/2019 | Maeda et al. |
| 2020/0056016 | A1 | 2/2020 | Sakurada |
| 2020/0101795 | A1 | 4/2020 | Sakurada et al. |
| 2020/0165419 | A1 | 5/2020 | Pawlak et al. |
| 2021/0101409 | A1 | 4/2021 | Watanabe et al. |
| 2022/0195154 | A1 | 6/2022 | Hayashi et al. |

FOREIGN PATENT DOCUMENTS

| | | | |
|---|---|---|---|
| DE | 102015210422 | A1 | 12/2016 |
| DE | 102015218745 | A1 | 3/2017 |
| EP | 0778311 | A1 | 6/1997 |
| EP | 1035164 | A1 | 9/2000 |
| EP | 2285852 | | 11/2009 |
| EP | 2204406 | A1 | 7/2010 |
| EP | 2455232 | A1 | 5/2012 |
| EP | 2532309 | A2 | 12/2012 |
| EP | 3294574 | | 11/2016 |
| EP | 3 109 066 | A1 | 12/2016 |
| EP | 3103655 | A1 | 12/2016 |
| EP | 3303004 | A1 | 12/2016 |
| EP | 3 450 203 | A1 | 3/2019 |
| EP | 3 450 206 | A1 | 3/2019 |
| KR | 10-2014-0030706 | A | 3/2014 |
| WO | 96/37547 | A2 | 11/1996 |
| WO | 99/09036 | A1 | 2/1999 |
| WO | 99/28380 | A1 | 6/1999 |
| WO | 02/30939 | A1 | 4/2002 |
| WO | 02/31041 | A1 | 4/2002 |
| WO | 02/083782 | A1 | 10/2002 |
| WO | 03/002648 | A1 | 1/2003 |
| WO | 03/002649 | A1 | 1/2003 |
| WO | 2004/033548 | A1 | 4/2004 |
| WO | 2006/023815 | A2 | 3/2006 |
| WO | 2006/125532 | A1 | 11/2006 |
| WO | 2006/125533 | A1 | 11/2006 |
| WO | 2006/125534 | A1 | 11/2006 |
| WO | 2007/098080 | A2 | 8/2007 |
| WO | 2008/055986 | A2 | 5/2008 |
| WO | 2010/072685 | A1 | 7/2010 |
| WO | 2016/180649 | A1 | 11/2016 |
| WO | 2018/079800 | A1 | 5/2018 |
| WO | 2018/079801 | A1 | 5/2018 |
| WO | 2018/079802 | A1 | 5/2018 |
| WO | 2018/079804 | A1 | 5/2018 |
| WO | 2018/182042 | A1 | 10/2018 |
| WO | 2018/203002 | A1 | 11/2018 |
| WO | 2018/221630 | A1 | 12/2018 |
| WO | 2019/016885 | A1 | 1/2019 |
| WO | 2018/043699 | A1 | 6/2019 |

OTHER PUBLICATIONS

International Search Report dated Jan. 22, 2020, in corresponding PCT/JP2019/017582 (3 pages).

S. Brunauer, et al., "Adsorption of Gases in Multimolecular Layers", J. Am. Chem. Soc., vol. 60, pp. 309-319 (1938).

* cited by examiner

RUBBER COMPOSITION

TECHNICAL FIELD

The field of the invention is rubber compositions, for example, for a rubber article, particularly for tires, shoes or caterpillar tracks, more particularly for tires, still more particularly for tire treads.

BACKGROUND ART

In a known way (for example, the following patent literature 1), liquid diene polymers have been used in rubber compositions of rubber articles in order to improve the processability.

CITATION LIST

Patent Literature

PTL 1
EP1035164

However, the improvement by the liquid diene polymer can be disadvantageous to the hysteresis property of the rubber compositions, and thus a constant objective of the manufactures of the articles is improvement of balance of performances (the processability and the hysteresis property).

SUMMARY OF INVENTION

Technical Problem

During the research, the inventor has discovered a specific rubber composition which allows an unexpectedly improved balance of performances between the processability and the hysteresis property.

In the present description, unless expressly stated otherwise, all the percentages (%) indicated are percentages by weight (wt %).

The expression "elastomer matrix" is understood to mean, in a given composition, all of the elastomers present in said rubber composition.

The abbreviation "phr" signifies parts by weight per hundred parts by weight of the elastomer matrix in the considered rubber composition.

In the present description, unless expressly indicated otherwise, each $Tg_{DSC}$ (glass transition temperature) is measured in a known way by DSC (Differential Scanning calorimetry) according to Standard ASTM D3418-08.

Any interval of values denoted by the expression "between a and b" represents the range of values of more than "a" and of less than "b" (i.e. the limits a and b excluded) whereas any interval of values denoted by the expression "from a to b" means the range of values going from "a" to "b" (i.e. including the strict limits a and b).

The expression "based on" should be understood in the present application to mean a composition comprising the mixture(s) and/or the product of the reaction of the various constituents used, some of the constituents being able or intended to react together, at least partly, during the various manufacturing phases of the composition, in particular during the vulcanization (curing).

Solution to Problem

A first aspect of the invention is a rubber composition based on at least an elastomer matrix comprising at least one first diene elastomer bearing at least one $SiOR_1$ function, $R_1$ being a hydrogen atom or a hydrocarbon radical, the $SiOR_1$ function not located at the chain ends of the first diene elastomer a reinforcing filler comprising a reinforcing inorganic filler, and a plasticizing agent comprising a liquid plasticizer comprising a liquid diene polymer bearing at least one function.

Advantageous Effects of Invention

The specific rubber composition allows improving the balance of performances between the processability and the hysteresis property.

Each of the below aspect(s), the embodiment(s) and the variant(s) including each of the preferred range(s) and/or matter(s) may be applied to any one of the other aspect(s), the other embodiment(s) and the other variant(s) of the invention unless expressly stated otherwise.

Elastomer (or loosely "rubber", the two terms being regarded as synonyms) of the "diene" type is to be understood in a known manner as an (meaning one or more) elastomer derived at least partly (i.e. a homopolymer or a copolymer) from diene monomers (monomers bearing two carbon-carbon double bonds, conjugated or not).

These diene elastomers can be classified into two categories: "essentially unsaturated" or "essentially saturated". Generally, the expression "essentially unsaturated" is understood to mean a diene elastomer resulting at least in part from conjugated diene monomers having a content of units of diene origin (conjugated dienes) which is greater than 15% (mol %); thus it is that diene elastomers such as butyl rubbers or diene/α-olefin copolymers of the EPDM type do not fall under the preceding definition and may especially be described as "essentially saturated" diene elastomers (low or very low content of units of diene origin, always less than 15%). In the category of "essentially unsaturated" diene elastomers, the expression "highly unsaturated" diene elastomer is understood to mean in particular a diene elastomer having a content of units of diene origin (conjugated dienes) which is greater than 50%.

Although it applies to any type of diene elastomer, a person skilled in the art of rubber articles (for example, tires) will understand that the invention is preferably employed with essentially unsaturated diene elastomers.

Given these definitions, the expression diene elastomer capable of being used in the compositions in accordance with the invention is understood in particular to mean:

(a)—any homopolymer obtained by polymerization of a conjugated diene monomer, preferably having from 4 to 12 carbon atoms;

(b)—any copolymer obtained by copolymerization of one or more conjugated dienes with one another or with one or more vinyl aromatic compounds preferably having from 8 to 20 carbon atoms.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl) styrene, methoxystyrenes, chlorostyrenes, vinylmesitylene, divinylbenzene or vinylnaphthalene.

The first diene elastomer may be selected from the group consisting of polybutadiene(s) (BR(s)), synthetic polyisoprene(s) (IR(s)), natural rubber (NR), butadiene copolymers, isoprene copolymers and the combinations thereof; such copolymer(s) is selected more preferably from the group consisting of styrene-butadiene copolymer(s) (SBR(s)) and the combinations thereof.

The first diene elastomer may have any microstructure which depends on the polymerization conditions used, in particular on the presence or absence of a modifying and/or randomizing agent and on the amounts of modifying and/or randomizing agent employed. This elastomer may, for example, be a block, statistical, sequential or micro sequential elastomer and may be prepared in dispersion or in solution.

The first diene elastomer bears at least one SiOR function, R being a hydrogen atom or a hydrocarbon radical.

The expression "hydrocarbon radical" means a monovalent group essentially consisting of carbon and hydrogen atoms. Such a group may comprise at least one heteroatom, and it is known that the assembly formed by the carbon and hydrogen atoms represents the major number fraction in the hydrocarbon radical, for example alkyl or alkoxyalkyl; preferably assembly formed by the carbon and hydrogen atoms represents the entirety of the hydrocarbon radical(s), for example alkyl. Such a SiOR (R is alkyl or alkoxyalkyl) is referred as an "alkoxysilane" function. While, a SiOH (R is a hydrogen atom) is referred as a "silanol" function.

The SiOR function borne by the first diene elastomer is not located at the chain ends of the first diene elastomer.

According to a first variant of the first aspect, the SiOR function borne by the first diene elastomer may be a pendant group, which is equivalent to saying that the silicon atom of the SiOR function may not be inserted between the carbon-carbon bonds of the elastomer chain of the first diene elastomer. A diene elastomer bearing a pendant SiOR function may for example be prepared by hydrosilylation of the elastomer chain by a silane bearing an alkoxysilane group, followed by hydrolysis of the alkoxysilane function to give a SiOR function.

According to a second variant of the first aspect, the SiOR function borne by the first diene elastomer may not be a pendant group, but maybe be situated in the elastomer chain, that is, may be within the elastomer chain, which is equivalent to saying that the silicon atom of the SiOR function may be inserted between the carbon-carbon bonds of the elastomer chain of the first diene elastomer. Such a diene elastomer may be prepared according to the procedure described in a patent EP 2 285 852 B1. This second variant is preferential and applies to the first aspect.

A second aspect of the invention is the rubber composition according to the first aspect, wherein the first diene elastomer is a styrene-butadiene copolymer (SBR), preferably a solution styrene-butadiene copolymer which is a copolymer of butadiene and styrene, prepared in solution.

A third aspect of the invention is the rubber composition according to the first aspect or the second aspect, wherein the first diene elastomer further bears at least one amine function, preferably at least one tertiary amine function.

According to a preferred embodiment of the third aspect, the amine function borne by the first diene elastomer may be a tertiary amine function. Mention will be made, as tertiary amine function, of the amines substituted with $C_1$-$C_{10}$ alkyl radicals, preferably $C_1$-$C_4$ alkyl, more preferably methyl or ethyl radical(s).

Generally, such a function borne by an elastomer, particularly a diene elastomer, may be located on the elastomer chain end(s) or may not be located at the elastomer chain ends, that is, may be away from the chain ends. The first case occurs for example when the diene elastomer is prepared using a polymerization initiator bearing the function or using a functionalizing agent. The second case occurs for example when the diene elastomer is modified by the use of a coupling agent or star-branching agent bearing the function.

According to this embodiment or a preferred embodiment of the third aspect, the amine function borne by the first diene elastomer may be a pendant group. The pendant position of the amine function means, in a known way, that the nitrogen atom of the amine function may not be inserted between the carbon-carbon bonds of the elastomer chain of the first diene elastomer.

A fourth aspect of the invention is the rubber composition according to the third aspect, wherein the SiOR function bears the amine function.

Such a diene elastomer may result from the modification of a diene elastomer by a coupling agent that introduces, the elastomer chain, an alkoxysilane group bearing an amine function according to the operating procedure described in a patent EP 2 285 852 B1. The following are suitable for example as coupling agent: N,N-dialkylaminopropyltrialkoxysilanes, $C_1$-$C_{10}$, preferably $C_1$-$C_4$, dialkyl groups, the compounds 3-(N,N-dimethylaminopropyl)trimethoxysilane, 3-(N,N-dimethylaminopropyl)triethoxysilane, 3-(N,N-diethylaminopropyl)trimethoxysilane, 3-(N,N-diethylaminopropyl)triethoxysilane being most particularly preferred, irrespective of the embodiment of the invention.

A fifth aspect of the invention is the rubber composition according to any one of the first to the fourth aspects, wherein R of the SiOR function is a hydrocarbon radical.

According to a preferred embodiment of the fifth aspect, the hydrocarbon radical may be an alkyl radical, preferably an alkyl radical having 1 to 12 carbon atoms, more preferably a branched, linear or else cyclic alkyl radical having 1 to 12 carbon atoms, still more preferably 1 to 6 carbon atoms, particularly 1 to 4 carbon atoms, more particularly methyl or ethyl radical(s).

A sixth aspect of the invention is the rubber composition according to any one of the first to the fifth aspects, wherein the first diene elastomer has a glass transition temperature ($Tg_{DSC}$) of lower than −40° C., (for example, between −100° C. and −40° C.), advantageously less than −45° C. (for example, between −90° C. and −45° C.).

A seventh aspect of the invention is the rubber composition according to any one of the first to the sixth aspects, wherein the elastomer matrix optionally comprises at least one second diene elastomer different from the first diene elastomer, that is, the elastomer matrix does not comprise any second diene elastomer different from the first diene elastomer, or the elastomer matrix further comprises at least one second diene elastomer different from the first diene elastomer, and wherein the amount of the first diene elastomer is from 20 to 100 phr, preferably between 50 and 100 phr, more preferably from 55 to 95 phr, still more preferably from 60 to 90 phr, particularly from 65 to 85 phr, and wherein the amount of the second diene elastomer is 0 to 80 phr, preferably between 0 and 50 phr, more preferably from 5 to 45 phr, still more preferably from 10 to 40 phr, particularly from 15 to 35 phr.

According to a preferred embodiment of the seventh aspect, the second diene elastomer is selected from the group consisting of polybutadienes, natural rubber, synthetic polyisoprenes, butadiene copolymers, isoprene copolymers and the combinations thereof, preferably selected from the group consisting of polybutadienes and the combinations thereof.

The rubber composition according to the invention is based on a reinforcing filler.

Use may be made of any type of reinforcing filler known for its capabilities of reinforcing a rubber composition which can be used for the manufacture of rubber articles, for example a reinforcing organic filler, such as carbon black, or a reinforcing inorganic filler, such as silica, with which a coupling agent is combined in a known way.

According to a preferred embodiment of the invention, the amount of the reinforcing filler is more than 95 phr (for example, between 95 and 315 phr), preferably more than 105 phr (for example, between 105 and 295 phr), more preferably more than 115 phr (for example, between 115 and 275 phr), still more preferably more than 125 phr (for example, between 125 and 255 phr), particularly more than 135 phr (for example, between 135 and 235 phr), more particularly more than 145 phr (for example, between 145 and 215 phr), still more particularly more than 155 phr (for example, between 155 and 195 phr), advantageously more than 165 phr (for example, between 165 and 175 phr).

The reinforcing filler in the rubber composition according to the invention comprises a reinforcing inorganic filler, preferably the reinforcing filler predominately comprises the reinforcing inorganic filler, that is, the reinforcing filler comprises more than 50%, more preferably more than 60%, still more preferably 70%, particularly more than 80%, more particularly more than 90%, by weight of the reinforcing inorganic filler per 100% by weight of the reinforcing filler.

The expression "reinforcing inorganic filler" should be understood here to mean any inorganic or mineral filler, whatever its color and its origin (natural or synthetic), also referred to as "white filler", "clear filler" or even "non-black filler", in contrast to carbon black, capable of reinforcing by itself alone, without means other than an intermediate coupling agent, a rubber composition intended for the manufacture of rubber articles (for example, tires), in other words capable of replacing, in its reinforcing role, a conventional tire-grade carbon black; such a filler is generally characterized, in a known manner, by the presence of hydroxyl (—OH) groups at its surface.

The physical state under the presence of this filler is unimportant, whether it is in the form of powder, microbeads, granules, beads or any other suitable densified form. Of course, the reinforcing inorganic filler of the combinations of various reinforcing inorganic fillers, preferably of highly dispersible siliceous and/or aluminous fillers is described hereafter.

Mineral fillers of the siliceous type, preferably silica ($SiO_2$) and/or the aluminous type, preferably alumina ($Al_2O_3$) are suitable in particular as the reinforcing inorganic fillers.

An eighth aspect of the invention is the rubber composition according to any one of the first to the seventh aspects, wherein the amount of the reinforcing inorganic filler is more than 90 phr (for example, between 90 and 310 phr), preferably more than 100 phr (for example, between 100 and 290 phr), more preferably more than 110 phr (for example, between 110 and 270 phr), still more preferably more than 120 phr (for example, between 120 and 250 phr), particularly more than 130 phr (for example, between 130 and 230 phr), more particularly more than 140 phr (for example, between 140 and 210 phr), still more particularly more than 150 phr (for example, between 150 and 190 phr), advantageously more than 160 phr (for example, between 160 and 170 phr).

A ninth aspect of the invention is the rubber composition according to any one of the first to the eighth aspects, wherein the reinforcing inorganic filler predominately comprises silica, that is, the reinforcing inorganic filler comprises more than 50%, preferably more than 75%, more preferably 100%, by weight of silica per 100% by weight of the reinforcing inorganic filer. The reinforcing inorganic filler may comprise a type of silica or a blend of several silicas. The silica used may be any reinforcing silica known to a person skilled in the art, in particular any precipitated or pyrogenic silica having a BET surface area and a CTAB specific surface area that are both less than 450 $m^2/g$, preferably from 20 to 400 $m^2/g$, more preferably from 50 to 350 $m^2/g$, still more preferably from 100 to 300 $m^2/g$, particularly from 150 and 250 $m^2/g$. Such silica may be covered or not.

The BET surface area is measured according to a known method, that is, by gas adsorption using the Brunauer-Emmett-Teller method described in "The Journal of the American Chemical Society", Vol. 60, page 309, February 1938, and more specifically, in accordance with the French standard NF ISO 9277 of December 1996 (multipoint volumetric method (5 points); where gas: nitrogen, degassing: 1 hour at 160° C., relative pressure range p/po: 0.05 to 0.17). The CTAB specific surface area is determined according to the French standard NF T 45-007 of November 1987 (method B).

A person skilled in the art will understand that a reinforcing filler of another nature, in particular organic nature, such as carbon black, might be used as filler equivalent to the reinforcing inorganic filler described in the present section, provided that this reinforcing filler is covered with an inorganic layer, such as silica, or else comprises, at its surface, functional sites, in particular hydroxyls, requiring the use of a coupling agent in order to form the connection between the filler and the elastomer. By way of example, mention may be made of carbon blacks for rubber articles (for example, tires), such as described in patent applications WO 96/37547 and WO 99/28380.

A tenth aspect of the invention is the rubber composition according to any one of the first to the ninth aspects, wherein the reinforcing filler further comprises carbon black, and wherein the amount of carbon black is less than 10 phr (for example, between 0 and 10 phr), preferably less than 9 phr (for example, between 1 and 9 phr), more preferably less than 8 phr (for example, between 2 and 8 phr).

Within the ranges indicated, there is a benefit of coloring properties (black pigmentation agent) and anti-UV properties of carbon blacks, without furthermore adversely affecting the typical performance provided by the reinforcing inorganic filler, namely low hysteresis (reduced rolling resistance).

In order to couple the reinforcing inorganic filler to the elastomer matrix, for instance, the diene elastomer, use can be made, in a known manner, of a coupling agent (or bonding agent) intended to provide a satisfactory connection, of chemical and/or physical nature, between the reinforcing inorganic filler (surface of its particles) and the elastomer matrix, for instance, the diene elastomer. This coupling agent is at least bifunctional. Use can be made in particular of at least bifunctional organosilanes or polyorganosiloxanes.

Use can be made in particular of silane polysulphides, referred to as "symmetrical" or "asymmetrical" depending on their particular structure, as described, for example, in applications WO 03/002648, WO 03/002649 and WO 2004/033548.

Particularly suitable silane polysulphides correspond to the following general formula (I):

Z-A-Sx-A-Z, (I)

in which:

x is an integer from 2 to 8 (preferably from 2 to 5);

A is a divalent hydrocarbon radical (preferably, $C_1$-$C_{18}$ alkylene groups or $C_6$-$C_{12}$ arylene groups, more particularly $C_1$-$C_{10}$, in particular $C_1$-$C_4$, alkylenes, especially propylene);

Z corresponds to one of the formulae below:

[Chem. 1]

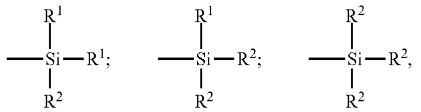

in which:

the $R^1$ radicals which are unsubstituted or substituted and identical to or different from one another, represent a $C_1$-$C_{18}$ alkyl, $C_5$-$C_{18}$ cycloalkyl or $C_6$-$C_{18}$ aryl group (preferably, $C_1$-$C_6$ alkyl, cyclohexyl or phenyl groups, in particular $C_1$-$C_4$ alkyl groups, more particularly methyl and/or ethyl), the $R^2$ radicals which are unsubstituted or substituted and identical to or different from one another, represent a $C_1$-$C_{18}$ alkoxyl or $C_5$-$C_{18}$ cycloalkoxyl group (preferably a group selected from $C_1$-$C_8$ alkoxyls and $C_5$-$C_8$ cycloalkoxyls, more preferably a group selected from $C_1$-$C_4$ alkoxyls, in particular methoxyl and ethoxyl), are suitable in particular, without limitation of the above definition.

In the case of a mixture of alkoxysilane polysulphides corresponding to the above formula (I), in particular normal commercially available combinations, the mean value of the "x" indices is a fractional number preferably of between 2 and 5, more preferably of approximately 4. However, the present invention can also advantageously be carried out, for example, with alkoxysilane disulphides (x=2).

Mention will more particularly be made, as examples of silane polysulphides, of bis(($C_1$-$C_4$)alkoxyl($C_1$-$C_4$)alkylsilyl($C_1$-$C_4$)alkyl)polysulphides (in particular disulphides, trisulphides or tetrasulphides), such as, for example, bis(3-trimethoxysilylpropyl) or bis(3-triethoxysilylpropyl)polysulphides. Use is in particular made, among these compounds, of bis(3-triethoxysilylpropyl)tetrasulphide, abbreviated to TESPT, of formula $[(C_2H_5O)_3Si(CH_2)_3S_2]_2$, or bis(3-triethoxysilylpropyl)disulphide, abbreviated to TESPD, of formula $[(C_2HSO)_3Si(CH_2)_3S]_2$. Mention will also be made, as preferred examples, of bis(mono($C_1$-$C_4$)alkoxyldi($C_1$-$C_4$)alkyl silylpropyl)polysulphides (in particular disulphides, trisulphides or tetrasulphides), more particularly bis(monoethoxydimethylsilylpropyl)tetrasulphide, as described in patent application WO 02/083782 (or U.S. Pat. No. 7,217,751).

Mention will in particular be made, as coupling agent other than alkoxysilane polysulphide, of bifunctional POSs (polyorganosiloxanes) or of hydroxysilane polysulphides ($R^2$=OH in the above formula (I)), such as described in patent applications WO 02/30939 (or U.S. Pat. No. 6,774,255) and WO 02/31041 (or US 2004/051210), or of silanes or POSs carrying azodicarbonyl functional groups, such as described, for example, in patent applications WO 2006/125532, WO 2006/125533 and WO 2006/125534.

As examples of other silane sulphides, mention will be made, for example, of the silanes bearing at least one thiol (—SH) function (referred to as mercaptosilanes) and/or at least one blocked thiol function, such as described, for example, in patents or patent applications U.S. Pat. No. 6,849,754, WO 99/09036, WO 2006/023815, WO 2007/098080, WO 2008/055986 and WO 2010/072685.

Of course, use could also be made of combinations of the coupling agents described previously, as described in particular in the aforementioned patent application WO 2006/125534.

According to a preferred embodiment of the invention, the content of coupling agent is from 0.5 to 15% by weight per 100% by weight of the reinforcing inorganic filler, particularly silica.

According to a preferred embodiment of the invention, the rubber composition of the tread of the rubber composition according to the invention is based on less than 50 phr (for example, between 0 and 50 phr), preferably less than 40 phr (for example, between 1 and 40 phr), more preferably more less than 30 phr (for example, between 2 and 30 phr), of coupling agent.

The rubber composition according to the invention is based on a plasticizing agent.

The role of the plasticizing agent is to soften the matrix by diluting the elastomer and the reinforcing filler.

According to a preferred embodiment of the invention, the amount of the plasticizing agent is more than 45 phr (for example, between 45 and 205 phr), preferably more than 55 phr (for example, between 55 and 195 phr), more preferably more than 65 phr (for example, between 65 and 185 phr), still more preferably more than 75 phr (for example, between 75 and 175 phr), particularly more than 85 phr (for example, between 85 and 165 phr), particularly more than 95 phr (for example, between 95 and 155 phr), more particularly more than 105 phr (for example, between 105 and 145 phr), still more particularly more than 115 phr (for example, between 115 and 135 phr).

The plasticizing agent in the rubber composition according to the invention comprises the liquid plasticizer.

The liquid plasticizer is liquid at 20° C. by definition, and its $Tg_{DSC}$ is by definition less than −20° C., preferably less than −30° C., more preferably less than −40° C.

Any extending oil, whether of aromatic or non-aromatic nature, any liquid plasticizing agent known for its plasticizing properties with regard to elastomer matrix(es) (for instance, diene elastomer), can be used as the liquid plasticizer. At ambient temperature (20° C.) under atmospheric pressure, these plasticizers or these oils, which are more or less viscous, are liquids (that is to say, as a reminder, substances that have the ability to eventually take on the shape of their container), as opposite to plasticizing hydrocarbon resin(s) which are by nature solid at ambient temperature (20° C.) under atmospheric pressure.

According to a preferred embodiment of the invention, the amount of the liquid plasticizer is more than 10 phr (for example, between 10 and 90 phr), preferably more than 20 phr (for example, between 20 and 80 phr), more preferably more than 30 phr (for example, between 30 and 70 phr), still more preferably more than 40 phr (for example, between 40 and 60 phr).

The liquid plasticizer in the plasticizing agent in the rubber composition according to the invention comprises a liquid diene polymer.

The liquid diene polymer is a diene polymer, and is liquid at 20° C. by definition.

An eleventh aspect of the invention is the rubber composition according to any one of the first to the tenth aspects, wherein the amount of the liquid diene polymer is at most 25 phr (for example, from 1 to 25 phr), preferably at most 20 phr (for example, from 3 to 20 phr), more preferably at most 15 phr (from 5 to 15 phr).

A twelfth aspect of the invention is the rubber composition according to any one of the first to the eleventh aspects, wherein the liquid diene polymer has a glass transition temperature of less than −60° C. (for example, between −100° C. and −60° C.), preferably less than −65° C. (for example, between −95° C. and −65° C.), more preferably less than −70° C. (for example, between −90° C. and −70° C.), still more preferably less than −75° C. (for example, between −85° C. and −75° C.).

A thirteenth aspect of the invention is the rubber composition according to any one of the first to twelfth aspects, wherein the liquid diene polymer has a number average molar mass of less than 6000 g/mol (for example, between 500 and 6000 g/mol), preferably less than 5500 g/mol (for example, between 1000 and 5500 g/mol), more preferably less than 5000 g/mol (for example, between 1500 and 5000 g/mol), still more preferably less than 4000 g/mol (for example, between 2000 and 4000 g/mol).

The number average molar mass (Mn) can be measured by gel permeation chromatography (GPC).

In case of gel permeation chromatography (GPC) of hydroxyl-terminated polybutadienes: The measurements can be carried out at 40° C. in tetrahydrofuran (THF) at a concentration of 1 g/L and a flow rate of 0.3 ml/min. Chromatographic separation can be achieved using a PSS SDV Micro 5μ/4.6×30 mm precolumn and a PSS SDV Micro linear S 5μ/4.6×250 mm (2×) separation column. Detection can be by means of an RI detector. Calibration can be carried out by means of a polybutadiene standard (PSS-Kit polybutadiene-1,4, Mp 83 1-106000, Part No.: PSS-bdfkit, Mn: 1830/4330/9300/18000/33500).

In cast of gel permeation chromatography (GPC) of silane terminated polybutadienes: The measurements can be carried out at room temperature in tetrahydrofuran (THF) at a concentration of 5 g/L and a flow rate of 1 ml/min. Chromatographic separation can be effected using a combination of styrene-divinylbenzene columns (2×3 cm, 5 μn, linear; 1×30 cm 5 μm, 100 Å). Detection can be by means of an RI detector. Calibration can be carried out by means of polystyrene standards and absolute molecular weights obtained via Mark-Houwink constants (a=0.73; k=0.0266 ml/g).

According to a preferred embodiment of the invention, the liquid diene polymer is selected from the group consisting of liquid polybutadiene(s), liquid polyisoprene(s), liquid styrene-butadiene copolymer(s), and the combinations thereof.

According to a more preferred embodiment of the preferred embodiment, the liquid diene polymer is preferably selected from the group consisting of liquid polybutadiene(s), liquid polyisoprene(s), and the combinations thereof.

According to another more preferred embodiment of the preferred embodiment, the liquid diene polymer is preferably selected from the group consisting of liquid polybutadiene(s), liquid styrene-butadiene copolymer(s), and the combinations thereof.

A fourteenth aspect of the invention is the rubber composition according to any one of the first to thirteenth aspects, wherein the liquid diene polymer comprises the 1,3-butadiene derived monomer units being 1,2-vinyl, 1,4-trans and 1,4-cis, and wherein the proportion of 1,2-vinyl in the entirety of the 1,3-butadiene derived monomer units present in the liquid diene polymer is less than 40 mol % (for example, between 0 and 40 mol %), preferably less than 35 mol % (for example, between 5 and 35 mol %), more preferably less than 30 mol % (for example, between 10 and 30 mol %), and wherein the sum of the proportions of 1,4-trans and 1,4-cis in the entirety of the 1,3-butadiene derived monomer units present in the liquid diene polymer is more than 60 mol % (for example, between 60 and 100 mol %), preferably more than 65 mol % (for example, between 65 and 95 mol %), more preferably more than 70 mol % (between 70 and 90 mol %).

According to a preferred embodiment of the fourteenth aspect, wherein the proportion of 1,4-trans in the entirety of the 1,3-butadiene derived monomer units present in the liquid diene polymer is more than 30 mol % (for example, between 30 and 90 mol %), preferably more than 35 mol % (for example, between 35 and 85 mol %), more preferably more than 40% (for example, between 40 and 80 mol %), still more preferably more than 45% (for example, between 45 and 75 mol %), particularly more than 50 mol % (for example, between 50 and 70 mol %).

The features of the above microstructure (1,2-vinyl content; 1,4-cis content; and 1,4-trans content) can be determined after completion of synthesis of the liquid diene polymer by nuclear magnetic resonance (NMR) with $^{1}$H, $^{13}$C or the both, for example, $^{13}$C NMR (90.5628 MHz; relaxation agent: Cr $(acac)_3$; solvent: deuterated chloroform ($CDC_{13}$), Bruker 360 MHz).

A fifteenth aspect of the invention is the rubber composition according to any one of the first to the fourteenth aspects, wherein the liquid diene polymer is a liquid polybutadiene.

According to a preferred embodiment of the fifteenth aspect, the term "liquid polybutadiene" as used herein is to be understood as meaning a product obtainable by polymerization of monomer units each having at least two conjugated double bonds, wherein in order of increasing preference, at least 80, 85, 90, 95, 98, 99 or 99.9% of the monomer units are 1,3-butadiene.

The liquid diene polymer in the liquid plasticizer in the plasticizing agent in the rubber composition according to the invention bears at least one function.

A sixteenth aspect of the invention is the rubber composition according to any one of the first to the fifteenth aspects, wherein the liquid diene polymer is such that the function comprises at least one function selected from the group consisting of silane function(s), hydroxyl function(s), anhydride function(s) (for example, maleic anhydride functions), and the combinations thereof.

According to a preferred embodiment of the invention, the liquid diene polymer has an average functionality of more than 1.0 (for example, between 1.0 and 4.0), preferably at least 2.0 (from 2.0 to 3.0). The average functionality can be calculated via the number average molar mass (Mn) of the liquid diene polymer and the function number (for example, the number of silane groups, the number of hydroxyl groups, and the number of anhydride groups).

According to a preferred embodiment of the sixteenth aspect, the liquid diene polymer is such that the function comprises at least one function selected from the group consisting of silane function(s), hydroxyl function(s), and the combinations thereof.

According to a more preferred embodiment of the sixteenth aspect or the preferred embodiment, the liquid diene polymer is a liquid diene polymer produced by free-radical polymerization.

According to a still more preferred embodiment of the more preferred embodiment, the liquid diene polymer is a liquid polybutadiene that comprises at least one hydroxyl function produced by polymerization of 1,3-butadiene in the presence of peroxide, water and an organic solvent, preferably the liquid polybutadiene is a hydroxyl-terminated liquid polybutadiene, as described in EP12169794, According to another still more preferred embodiment of the more preferred embodiment, the liquid diene polymer a liquid polybutadiene that comprises at least one silane function produced by reacting at least one organosilane compound (preferably, 3-isocyanatopropyltrimethoxysilane, isocyanatopropyltriethoxysilane or the combinations thereof) with the liquid polybutadiene comprising at least one hydroxyl function (preferably, a hydroxyl-terminated liquid polybutadiene), preferably a triethoxysilane-terminated liquid polybutadiene, as described in EP3294574.

A seventeenth aspect of the invention is the rubber composition according to any one of the first to the sixteenth aspects, wherein the liquid diene polymer is such that the function is a silane function.

According to a preferred embodiment of the invention, the liquid plasticizer optionally comprises at least one liquid plasticizer other than the liquid diene polymer, that is, the liquid plasticizer does not comprise any liquid plasticizer other than the liquid diene polymer, or comprises at least one liquid plasticizer other than the liquid diene polymer. Preferably, the liquid plasticizer other than the liquid diene polymer is selected from the group consisting of liquid diene polymer(s) not bearing any function, polyolefinic oil(s), naphthenic oil(s), paraffinic oil(s), Distillate Aromatic Extracts (DAE) oil(s), Medium Extracted Solvates (MES) oil(s), Treated Distillate Aromatic Extracts (TDAE) oil(s), Residual Aromatic Extracts (RAE) oil(s), Treated Residual Aromatic Extracts (TRAE) oil(s), Safety Residual Aromatic Extracts (SRAE) oil(s), mineral oil(s), vegetable oil(s), ether plasticizer(s), ester plasticizer(s), phosphate plasticizer(s), sulphonate plasticizer(s) and the combinations thereof, preferably selected from the group consisting of IVIES oils, TDAE oils, naphthenic oils, vegetable oils and the combinations thereof, more preferably selected from the group consisting of MES oils, vegetable oils and the combinations thereof, still more preferably selected from the group consisting of vegetable oils and the combinations thereof.

An eighteenth aspect of the invention is the rubber composition according to any one of the first to the seventeenth aspects, wherein the liquid plasticizer further comprises a vegetable oil, and wherein the amount in phr of vegetable oil is higher than one-third of the amount in phr of the liquid diene polymer.

According to a preferred embodiment of the eighteenth aspect, the amount in phr of vegetable oil is higher than that of the liquid diene polymer, preferably the amount in phr of vegetable oil is higher than twice of the amount in phr of the liquid diene polymer.

According to a preferred embodiment of the eighteenth aspect, the amount of the vegetable oil is more than 5 phr (for example, between 5 and 65 phr), preferably more than 10 phr (for example, between 10 and 60 phr), more preferably more than 15 phr (for example, between 15 and 55 phr), still more preferably more than 20 phr (for example, between 20 and 50 phr), particularly more than 25 phr (for example, between 25 and 45 phr), more particularly more than 30 phr (for example, between 30 and 40 phr).

According to a preferred embodiment of the eighteenth aspect, the vegetable oil(s) is made of an oil selected from the group consisting of linseed, safflower, soybean, corn, cottonseed, turnip seed, castor, tung, pine, sunflower, palm, olive, coconut, groundnut and grapeseed oils, and the combinations thereof, preferably sunflower oil(s), more preferably sunflower oil(s) containing over 60%, still preferably more over 70%, particularly over 80%, more particularly over 90%, still more particularly 100%, by weight of oleic acid.

A nineteenth aspect of the invention is the rubber composition according to any one of the first to the eighteenth aspects, wherein the plasticizing agent further comprises a hydrocarbon resin, and wherein the amount in phr of hydrocarbon resin is higher than that of the liquid diene polymer.

According to a preferred embodiment of the nineteenth aspect, the amount in phr of hydrocarbon resin is higher than twice of the amount in phr of the liquid diene polymer, preferably the amount in phr of hydrocarbon resin is higher than triple of the amount in phr of the liquid diene polymer.

According to a preferred embodiment of the nineteenth aspect, the amount in phr of hydrocarbon resin is higher than the total amount in phr of the liquid plasticizer.

According to a preferred embodiment of the nineteenth aspect, the amount of the hydrocarbon resin is more than 10 phr (for example, between 10 and 150 phr), preferably more than 15 phr (for example, between 15 and 145 phr), more preferably more than 20 phr (for example, between 20 and 140 phr), still more preferably more than 25 phr (for example, between 24 and 135 phr), particularly more than 30 phr (for example, between 30 and 130 phr), more particularly more than 35 phr (for example, between 35 and 125 phr), still more particularly more than 40 phr (for example, between 40 and 120 phr), advantageously more than 45 phr (for example, between 45 and 115 phr), more advantageously more than 50 phr (for example, between 50 and 110 phr), still more advantageously more than 55 phr (for example, between 55 and 105 phr), especially more than 60 phr (for example, between 60 and 100 phr), more especially more than 65 phr (for example, between 65 and 95 phr), still more especially more than 70 phr (for example, between 70 and 90 phr).

The hydrocarbon resin(s) are polymer well known by a person skilled in the art, which are essentially based on carbon and hydrogen, and thus miscible by nature in rubber composition(s), for instance, diene elastomer composition(s). They can be aliphatic or aromatic or also of the aliphatic/aromatic type, that is to say based on aliphatic and/or aromatic monomers. They can be natural or synthetic and may or may not be petroleum-based (if such is the case, also known under the name of petroleum resins). They are preferably exclusively hydrocarbon, that is to say, that they comprise only carbon and hydrogen atoms.

Preferably, the hydrocarbon resins as being "plasticizing" exhibit at least one, more preferably all, of the following characteristics:

- a $Tg_{DSC}$ of above 20° C. (for example between 20° C. and 100° C.), preferably above 30° C. (for example between 30° C. and 100° C.), more preferably above 40° C. (for example between 40° C. and 100° C.);
- a number-average molecular weight (Mn) of between 400 and 2000 g/mol (more preferably between 500 and 1500 g/mol);
- a polydispersity index (PI) of less than 3, more preferably less than 2 (reminder: PI=Mw/Mn with Mw the weight-average molecular weight).

The macrostructure (Mw, Mn and PI) of the hydrocarbon resins is determined by steric exclusion chromatography (SEC): solvent tetrahydrofuran; temperature 35; concentration 1 g/l; flow rate 1 ml/min; solution filtered through a filter with a porosity of 0.45 μm before injection; Moore calibration with polystyrene standards; set of 3 "Waters" columns in series ("Styragel" HR4E, HR1 and HR0.5);

detection by differential refractometer ("Waters 2410") and its associated operating software ("Waters Empower").

According to preferred embodiment of the nineteenth aspect, the hydrocarbon resin is selected from the group consisting of cyclopentadiene (abbreviated to CPD) homopolymer or copolymer resins, dicyclopentadiene (abbreviated to DCPD) homopolymer or copolymer resins, terpene homopolymer or copolymer resins, $C_5$ fraction homopolymer or copolymer resins, $C_9$ fraction homopolymer or copolymer resins, alpha-methyl styrene homopolymer or copolymer resins and the combinations thereof. Use is more preferably made, among the above copolymer resins, of those selected from the group consisting of (D)CPD/vinylaromatic copolymer resins, (D)CPD/terpene copolymer resins, (D)CPD/$C_5$ fraction copolymer resins, (D)CPD/$C_9$ fraction copolymer resins, terpene/vinylaromatic copolymer resins, terpene/phenol copolymer resins, $C_5$ fraction/vinyl-aromatic copolymer resins, $C_9$ fraction/vinylaromatic copolymer resins, and the combinations thereof.

The term "terpene" combines here, in a known way, the α-pinene, β-pinene and limonene monomers; use is preferably made of a limonene monomer, which compound exists, in a known way, in the form of three possible isomers: L-limonene (laevorotatory enantiomer), D-limonene (dextrorotatory enantiomer) or else dipentene, the racemate of the dextrorotatory and laevorotatory enantiomers. Styrene, α-methylstyrene, ortho-, meta- or para-methylstyrene, vinyltoluene, para-(tert-butyl)styrene, methoxystyrenes, chlorostyrenes, hydroxystyrenes vinylmesitylene, divinylbenzene, vinylnaphthalene, or any vinylaromatic monomer resulting from a $C_9$ fraction (or more generally from a $C_8$ to $C_{10}$ fraction) are suitable, for example, as vinylaromatic monomer. Preferably, the vinylaromatic compound is styrene or a vinylaromatic monomer resulting from a $C_9$ fraction (or more generally from a $C_8$ to $C_{10}$ fraction). Preferably, the vinylaromatic compound is the minor monomer, expressed as molar fraction, in the copolymer under consideration.

Mention may also be made, as examples of other preferred resins, of phenol-modified α-methylstyrene resins. It should be remembered that, in order to characterize these phenol-modified resins, use is made, in a known way, of a number referred to as "hydroxyl number" (measured according to Standard ISO 4326 and expressed in mg KOH/g). α-Methylstyrene resins, in particular those modified with phenol, are well known to a person skilled in the art and are available commercially.

The rubber compositions according to the invention may be based on all or a portion(s) of the usual additives generally used in the elastomer compositions intended in particular for rubber articles (for example, tires, shoes or caterpillar tracks), in more particular for tires, in still more particular for tire treads, such as, for example, protection agents, such as antiozone waxes, chemical antiozonants, antioxidants, reinforcing resins, methylene acceptors (for example phenolic novolak resin) or methylene donors (for example hexamethylenetetramine (HMT) or hexamethoxymethylmelamine (H3M)), a crosslinking system based either on sulphur or on donors of sulphur and/or per oxide and/or bismaleimides, vulcanization accelerators, or vulcanization activators.

The composition can be also based on coupling activators when a coupling agent is used, agents for covering the reinforcing inorganic filler or more generally processing aids capable, in a known way, by virtue of an improvement in the dispersion of the filler in the rubber matrix and of a lowering of the viscosity of the compositions, of improving their property of processing in the raw state; these agents are, for example, hydrolysable silanes, such as alkylalkoxysilanes, polyols, polyethers, amines, or hydroxylated or hydrolysable polyorganosiloxanes.

The rubber composition according to the invention may be manufactured in appropriate mixers using two successive preparation phases well known to a person skilled in the art: a first phase of thermomechanical working or kneading (referred to as "non-productive" phase) at high temperature, up to a maximum temperature of between 110° C. and 190° C., preferably between 130° C. and 180° C., followed by a second phase of mechanical working (referred to as "productive" phase) at a lower temperature, typically of less than 110° C., for example between 40° C. and 100° C., finishing phase during which the crosslinking or vulcanization system is incorporated.

A process which can be used for the manufacture of such compositions comprises, for example and preferably, the following steps:

- incorporating in the elastomer matrix, for instance, the diene elastomer(s), in a mixer, the reinforcing filler, the plasticizing agent during a first stage ("non productive" stage) everything being kneaded thermomechanically (for example in one or more steps) until a maximum temperature of between 110° C. and 190° C. is reached;
- cooling the combined mixture to a temperature of less than 100° C.;
- subsequently incorporating, during a second stage (referred to as a "productive" stage), a crosslinking system;
- kneading everything up to a maximum temperature of less than 110° C.;
- extruding or calendering the rubber composition thus obtained, in particular in the form of a tire tread.

According to a preferred embodiment of the invention, the first (non-productive) phase is carried out in a single thermomechanical stage during which all the necessary constituents may be introduced into an appropriate mixer, such as a standard internal mixer, followed, in a second step, for example after kneading for 1 to 2 minutes, by the other additives, optional additional filler-covering agents or processing aids, with the exception of the crosslinking system. The total kneading time, in this non-productive phase, is preferably between 1 and 15 min.

After cooling the mixture thus obtained, the crosslinking system may be then incorporated at low temperature (for example, between 40° C. and 100° C.), generally in an external mixer, such as an open mill; the combined mixture is then mixed (the second (productive) phase) for a few minutes, for example between 2 and 15 min.

The crosslinking system is preferably based on sulphur and on a primary vulcanization accelerator, in particular on an accelerator of sulphenamide type. Added to this vulcanization system are various known secondary accelerators or vulcanization activators, such as zinc oxide, stearic acid, guanidine derivatives (in particular diphenylguanidine), and the like, incorporated during the first non-productive phase and/or during the productive phase. The content of sulphur is preferably between 0.5 and 10.0 phr, more preferably between 0.5 and 3.0 phr, and that of the primary accelerator is preferably between 0.5 and 5.0 phr.

Use may be made, as accelerator (primary or secondary) of any compound capable of acting as accelerator of the vulcanization of elastomer matrix, for instance, diene elastomers, in the presence of sulphur, in particular accelerators of the thiazoles type and their derivatives, accelerators of thiurams types, or zinc dithiocarbamates. These accelerators are more preferably selected from the group consisting of 2-mercaptobenzothiazyl disulphide (abbreviated to "MBTS"), N-cyclohexyl-2-benzothiazole sulphenamide (abbreviated to "CBS"), N,N-dicyclohexyl-2 benzothiazole-sulphenamide ("DCBS"), N-tert-butyl-2-ben zothiazolesulphenamide ("TBBS"), N-tert-butyl-2 benzothiazolesulphenimide ("TBSP"), zinc dibenzyldithiocarbamate ("ZBEC"), Tetrabenzylthiuram disulfide ("TBZTD") and the combinations thereof.

The final composition thus obtained is subsequently calendered, for example in the form of a sheet or of a plaque, in particular for laboratory characterization, or else extruded in the form of a rubber profiled element which can be used directly as a laminate or an article, for example, a tire tread, a shoe sole and a caterpillar track tread.

The vulcanization (or curing) is carried out in a known way at a temperature generally of between 110° C. and 190° C. for a sufficient time which may vary, for example, between 5 and 90 min depending in particular on the curing temperature, the vulcanization system adopted and the vulcanization kinetics of the composition under consideration.

According to a preferred embodiment of the invention, an article comprises a rubber composition according to any one of the first to the nineteenth aspects.

According to a more preferred embodiment of the preferred embodiment, the article is a tire, a shoe, a conveyor or a caterpillar track, for example, a tire tread, a shoe sole, a conveyor belt and a caterpillar track tread.

According to a still more preferred embodiment of the more preferred embodiment, the article is a tire, preferably a tire in which the rubber composition according to any one of the first to the nineteenth aspects is comprised in its tread, sidewall(s) or the both.

The tires of the invention are particularly intended to equip passenger motor vehicles, including 4×4 (four-wheel drive) vehicles and SUV (Sport Utility Vehicles) vehicles, and industrial vehicles particularly selected from vans and heavy duty vehicles (i.e., bus or heavy road transport vehicles (lorries, tractors, trailers)).

A twentieth aspect of the invention is a tire tread comprising a rubber composition according to any one of the first to the nineteenth aspects.

According to a preferred embodiment of twentieth aspect, the tire tread comprising at least two radially superposed portions which comprises a radially external portion and a radially internal portion, the radially external portion intended to come into contact with the ground, the radially external portion being made of a first rubber composition, and the radially internal portion being made of a second rubber composition different from the first rubber composition.

According to a more preferred embodiment of the preferred embodiment, the first rubber composition is a rubber composition any one of the first to the nineteenth aspects.

According to another more preferred embodiment of the preferred embodiment, the second rubber composition is a rubber composition any one of the first to the nineteenth aspects.

According to an embodiment of the other more preferred embodiment, the radially external portion is intended to come into contact with the ground during service life of the tire.

According to another embodiment of the other more preferred embodiment, the radially external portion is not intended to come into contact with the ground during service life of the tire.

A radial direction is defined as a direction perpendicular to the axis of rotation of the tire, and the expression "radially" means "in radial direction". The expressions "radially on the inside (radially inner or radially internal), or respectively radially on the outside (radially outer or radially external)" mean "closer or, respectively, further away, from the axis of rotation of the tire, in the radial direction, than".

The service life of the tire means the duration to use the tire (for example, the term from the new state to the final state of the tire, the final state means a state on reaching the wear indicator bar(s) in the tread of tire).

The invention relates to the rubber compositions in the raw state (i.e., before curing) and in the cured state (i.e., after crosslinking or vulcanization).

The invention is further illustrated by the following non-limiting examples.

EXAMPLE

In order to confirm the effect of the invention, four rubber compositions (identified as C-1 (a reference), C-2 and C-3 (examples according to the invention), and C-4 (a comparative example)) are compared for Mooney plasticity (as an index of processability before curing) and $\tan(\delta)_{max}$ (as an index of hysteresis property after curing). They are based on a blend of BR and SBR bearing a SiOR function (as an elastomer matrix) reinforced with a blend of silica (as a reinforcing inorganic filler) and carbon black, and a plasticizing agent comprising a liquid polybutadiene (as a liquid diene polymer), a sunflower oil (as vegetable oil) and a $C_5/C_9$ hydrocarbon resin (as hydrocarbon resin. The formulations of the three rubber compositions are given at Table 1 with the content of the various products expressed in phr.

C-1: based on SBR bearing a SiOR function not located at the elastomer chain end, with non-functionalized liquid polybutadiene (a reference);

C-2: based on SBR bearing a SiOR function not located at the elastomer chain end, with a hydroxyl-terminated liquid polybutadiene (an example according to the invention);

C-3: based on SBR bearing a SiOR function not located at the elastomer chain end, with a triethoxysilane-terminated liquid polybutadiene (an example according to the invention);

C-4: based on SBR bearing a SiOR function located at the elastomer chain end, with a triethoxysilane-terminated liquid polybutadiene (a comparative example according to the invention).

Each rubber composition was produced as follows: The reinforcing filler, its associated coupling agent, the plasticizing agent, the elastomer matrix and the various other ingredients, with the exception of the vulcanization system, were successively introduced into an internal mixer having an initial vessel temperature of approximately 60° C.; the mixer was thus approximately 70% full (% by volume). Thermomechanical working (non-productive phase) was then carried out in one stage, which lasts in total approximately 3 to 4 minutes, until a maximum "dropping" temperature of 165° C. was reached. The mixture thus obtained was recovered and cooled and then sulphur and an accelerator of sulphenamide type were incorporated on an external mixer (homofinisher) at 20 to 30° C., everything being mixed (productive phase) for an appropriate time (for example, between 5 and 12 min).

The rubber compositions thus obtained were subsequently calendered, either in the form of sheets (thickness of 2 to 3 mm) or of fine sheets of rubber, for the measurement of their physical or mechanical properties, or in the form of profiled elements which could be used directly, after cutting and/or assembling to the desired dimensions, for example as tire semi-finished products, in particular as tire treads.

As the measurement of Mooney plasticity of each rubber composition before curing, the use was made of an oscillating consistometer as described in French Standard NF T 43-005 (November 1980). The Mooney plasticity measurement was carried out according to the following principle: the composition in the raw state (before curing) was molded in a cylindrical chamber heated to 100° C. After preheating for one minute, the rotor rotated within the test specimen at 2 revolutions/minute and the working torque for maintaining this movement was measured after rotating for 4 minutes. The Mooney plasticity (ML1+4) is generally expressed in "Mooney unit" (MU, With 1 MU: 0.83 Newton-meter), and is representative of the processability. The lower Mooney plasticity is, the better processability is, therefore, a value (Mooney plasticity (C-1)/Mooney plasticity (C-n)×100; where n=1, 2, 3 and 4) greater than that of the reference (C-1), set at 100, indicates an improved performance.

Each rubber composition was placed in a press with heated platens at a temperature (typically 160° C.), and for the time that was necessary for the crosslinking of these rubber compositions (typically several tens of minutes), at a pressure (typically 16 bar), and then, that is after curing, $\tan(\delta)_{max}$ of Each rubber composition was measured on a viscosity analyser (Metravib VA4000), according to the standard ASTM D 5992-96. A recording was made of the response of a sample of vulcanized composition (cylindrical test specimen with a thickness of 4 mm and a cross section of 400 $mm^2$), subjected to a simple alternating sinusoidal shear stress, at the frequency of 10 Hz, under defined temperature conditions, for example at 23° C. according to the standard ASTM D 1349-99. A strain amplitude sweep was carried out from 0.1% to 100% (outward cycle), then from 100% to 1% (return cycle). For the return cycle, the maximum value of tan(δ) observed, identified as $\tan(\delta)_{max}$ at 23° C., was indicated. The value of $\tan(\delta)_{max}$ at 23° C. is representative of the hysteresis property, and therefore of the rolling resistance. The lower $\tan(\delta)_{max}$ at 23° C. is, the better the hysteresis property (relative to rolling resistance) is, therefore, a value ($\tan(\delta)_{max}$ (C−1)/$\tan(\delta)_{max}$ (C−n)×100; where n=1, 2, 3 and 4) greater than that of the reference (C-1), set at 100, indicates an improved performance.

The results from Table 1 demonstrate that the rubber compositions (C-2 and C-3) according to the invention have an unexpectedly improved balance of performances between the processability and the hysteresis property than that of the reference or the comparative example (C-1 and C-4). The balance between the processability and the hysteresis property in Table 1 is a sum of the both performances.

In conclusion, the rubber composition according to the invention allows an improvement of the balance of performances between the processability and the hysteresis property.

TABLE 1

| | Reference C-1 | Example C-2 | Example C-3 | Comparative example C-4 |
|---|---|---|---|---|
| SBR1 (1) | 70 | 70 | 70 | |
| SBR2 (2) | | | | 70 |
| BR (3) | 30 | 30 | 30 | 30 |
| Carbon black (4) | 4 | 4 | 4 | 4 |
| Silica (5) | 165 | 165 | 165 | 165 |

TABLE 1-continued

| | Reference C-1 | Example C-2 | Example C-3 | Comparative example C-4 |
|---|---|---|---|---|
| Coupling agent (6) | 13 | 13 | 13 | 13 |
| Liquid diene polymer 1 (7) | 10 | | | |
| Liquid diene polymer 2 (8) | | 10 | | |
| Liquid diene polymer 3 (9) | | | 10 | 10 |
| Vegetable oil (10) | 37 | 37 | 37 | 37 |
| Hydrocarbon resin (11) | 80 | 80 | 80 | 80 |
| ZnO | 3 | 3 | 3 | 3 |
| Stearic acid | 3 | 3 | 3 | 3 |
| Antiozone wax | 3 | 3 | 3 | 3 |
| Antioxidant (12) | 3 | 3 | 3 | 3 |
| DPG (13) | 2 | 2 | 2 | 2 |
| Sulphur | 2 | 2 | 2 | 2 |
| Accelerator (14) | 3 | 3 | 3 | 3 |
| Mooney plasticity | 100 | 100 | 104 | 83 |
| $\tan(\delta)_{max}$ | 100 | 103 | 123 | 110 |
| Balance of performances | 200 | 203 | 227 | 193 |

(1) SBR1: solution SBR with 16% of styrene unit and 24% of unit 1,2 of the butadiene part ($Tg_{DSC}$=−65° C.) bearing a SiOR function, R being a methyl radical, the SiOR function not located at the ends of the elastomer chain; wherein the silicon atom of the SiOR function is inserted between the carbon-carbon bonds of the elastomer chain; the SBR further bearing a tertiary amine function made of the amine substituted with two methyl radicals; wherein the nitrogen atom of the amine function is not inserted between the carbon-carbon of the elastomer chain, and the SiOR function bears the amine function; the SBR prepared according to a process described in a patent EP 2 285 852 B1;

(2) SBR2: solution SBR with 16% of styrene unit and 24% of unit 1,2 of the butadiene part ($Tg_{DSC}$=−65° C.) bearing a SiOR function, R being a hydrogen atom, the SiOR being dimethylsilanol function at the end of the elastomer chain, the SBR prepared according to a process described in a patent EP 0 778 311 B1;

(3) BR: BR with 0.3% of 1,2-vinyl; 2.7% of 1,4-trans; 97% of 1,4-cis ($Tg_{DSC}$=−105° C.);

(4) Carbon black: Carbon black (ASTM grade N234 from Cabot);

(5) Silica: Silica ("Zeosil 1165MP" from Rhodia (CTAB, BET: about 160 $m^2/g$));

(6) Coupling agent TESPT ("Si69" from Evonik);

(7) Liquid diene polymer 1: non-functionalized liquid polybutadiene ("POLYVEST 130" from EVONIK, number-average molar mass (Mn): 4600 g/mol, $Tg_{DSC}$=−99° C., 1 mol % of 1,2-vinyl, 22 mol % of 1,4-trans, 77 mol % of 1,4-cis);

(8) Liquid diene polymer 2: hydroxyl-terminated liquid polybutadiene produced by free radical polymerization ("POLYVEST HT" from EVONIK, number-average molar mass (Mn): 2900 g/mol, $Tg_{DSC}$=−80° C., 22 mol % of 1,2-vinyl, 58 mol % of 1,4-trans, 20 mol % of 1,4-cis, average functionality: 2.4 (that means that a polybutadiene molecule has average 2.4 hydroxyl groups irrespective its length)));

(9) Liquid diene polymer 3: triethoxysilane-terminated liquid polybutadiene obtained by reacting hydroxyl-terminated polybutadiene produced by free radical polymerization with 3-isocyanatopropyltriethoxysilane ("POLYVEST EP ST-E-100" from EVONIK, number-average molar mass (Mn): 3300 g/mol, $Tg_{DSC}$=−80° C., 22 mol % of 1,2-vinyl, 58 mol % of 1,4-trans, 20 mol % of 1,4-cis, average functionality: 2.5 (that means that a polybutadiene molecule has an average 2.5 silane groups irrespective its length));

(10) Oleic sunflower oil ("Agripure 80" from Cargill, Weight percent oleic acid: 100%);

(11) Hydrocarbon resin $C_5/C_9$ type ("Escorez ECR-373" from Exxon, $Tg_{DSC}$=44° C.);

(12) N-(1,3-dimethylbutyl)-N-phenyl-para-phenylenediamine ("Santoflex 6-PPD" from Flexsys);

(13) Diphenylguanidine ("Perkacit DPG" from Flexsys);

(14) N-dicyclohexyl-2-benzothiazolesulphenamide ("Santocure CBS" from Flexsys).

The invention claimed is:

1. A rubber composition based on at least:

an elastomer matrix comprising at least one first diene elastomer bearing at least one $SiOR_1$ function and at least one amine function, $R_1$ being a hydrogen atom or a hydrocarbon radical, the $SiOR_1$ function not located at chain ends of the at least one first diene elastomer, the $SiOR_1$ function bearing the at least one amine function;

a reinforcing filler comprising a reinforcing inorganic filler in an amount greater than 90 phr; and a plasticizing agent comprising a hydrocarbon resin and a liquid plasticizer, the liquid plasticizer comprising a vegetable oil and a liquid polybutadiene polymer in an amount equal to or less than 25 phr, the liquid polybutadiene polymer bearing at least one function selected from the group consisting of a silane, a hydroxyl, an anhydride, and combinations thereof, wherein the at least one first diene elastomer is a styrene-butadiene copolymer being a modified diene elastomer via a N,N—($C_1$-$C_4$) dialkylaminopropyltrialkoxysilane, wherein the at least one first diene elastomer has a glass transition temperature of less than −40° C., wherein the reinforcing inorganic filler predominately comprises silica, wherein an amount of the hydrocarbon resin is greater than an amount of the liquid plasticizer, wherein an amount of the vegetable oil is greater than one-third of an amount of the liquid polybutadiene polymer, wherein the liquid polybutadiene polymer comprises 1,3-butadiene derived monomer units being 1,2-vinyl, 1,4-trans and 1,4-cis, wherein a proportion of 1,2-vinyl in an entirety of the 1,3-butadiene derived monomer units present in the liquid polybutadiene polymer is less than 40 mol %, wherein a sum of proportions of 1,4-trans and 1,4-cis in the entirety of the 1,3-butadiene derived monomer units present in the liquid polydiene polymer is more than 60 mol %, and wherein the liquid polybutadiene polymer has a glass transition temperature of less than −60° C. and a number average molar mass of less than 6000 g/mol.

2. The rubber composition according to claim 1, wherein $R_1$ of the $SiOR_1$ function is a hydrocarbon radical.

3. The rubber composition according to claim 1, wherein the elastomer matrix further comprises at least one second diene elastomer different from the at least one first diene elastomer, wherein the amount of the at least one first diene elastomer is from 20 to 100 phr, and wherein the amount of the at least one second diene elastomer is 0 to 80 phr.

4. The rubber composition according to claim 1, wherein the reinforcing filler further comprises carbon black, and wherein the amount of carbon black is less than 10 phr.

5. The rubber composition according to claim 1, wherein the liquid diene polymer is such that the function is a silane function.

6. A tire tread comprising a rubber composition according to claim 1.

* * * * *